US007992605B2

(12) United States Patent
Yee

(10) Patent No.: US 7,992,605 B2
(45) Date of Patent: Aug. 9, 2011

(54) MULTIFUNCTIONAL TIRE SUPPORT DEVICE

(76) Inventor: Julian Yee, Los Angeles, CA (US)

( * ) Notice: Subject to any disclaimer, the term of this patent is extended or adjusted under 35 U.S.C. 154(b) by 593 days.

(21) Appl. No.: 12/005,730

(22) Filed: Dec. 28, 2007

(65) Prior Publication Data

US 2009/0165917 A1    Jul. 2, 2009

(51) Int. Cl.
*B60C 5/00* (2006.01)
*B60C 5/02* (2006.01)
*B60C 19/00* (2006.01)
*B60C 19/12* (2006.01)

(52) U.S. Cl. ........ 152/155; 152/157; 152/158; 152/450; 152/510

(58) Field of Classification Search .................. 152/152, 152/155, 156, 157, 158, 165, 166, 195, 196, 152/197, 203, 204, 207, 510, 450, 511, 512, 152/516, 517, 518, 519, 520, 521, 522
See application file for complete search history.

(56) References Cited

U.S. PATENT DOCUMENTS

| | | | | |
|---|---|---|---|---|
| 1,085,010 A | * | 1/1914 | Bennett | 152/157 |
| 1,401,610 A | * | 12/1921 | Kuhn | 152/157 |
| 1,408,644 A | * | 3/1922 | Schuler | 152/157 |
| 1,546,043 A | * | 7/1925 | McGarvey | 152/157 |
| 1,841,773 A | * | 1/1932 | Worsley et al. | 152/328 |
| 2,242,788 A | * | 5/1941 | Marks | 152/158 |
| 2,482,221 A | * | 9/1949 | Sokolik | 152/310 |
| 3,451,457 A | * | 6/1969 | Leyer | 152/158 |

FOREIGN PATENT DOCUMENTS

JP         63-11402        *  1/1988
WO   WO 2005/047025   *  5/2005

OTHER PUBLICATIONS

Machine translation of JP 63-11402, Suzuki, H., Jan. 1988.*

* cited by examiner

*Primary Examiner* — Justin Fischer

(57) ABSTRACT

A tire assembly inserted in a conventional pneumatic tire that allows the driven vehicle to be operated in a normal operating condition as well as in both a low tire pressure and a "run flat" condition. The tire embodies a multifunctional tire support device that permits the tire even when punctured to continue to support the vehicle and never allows the tire to go entirely flat. The support device when installed reinforces the tire tread and its side walls by applying internal pressure against them should they collapse when tire is punctured. The invention embodies a means for supporting the tire with the multifunctional device and provides an additional embodiment that uses the same device with a backup redundant inner tube to provide support to the punctured or ruptured tire and permits it to be operated in a run flat condition. The inner tube is located in the assembly at a distance away from the tread so that any puncture of the tread would not also puncture the inner tube. This provides safety and security for the vehicle operating with this assembly installed in a conventional tire and a standard tire wheel rim.

2 Claims, 5 Drawing Sheets

MULTIFUNCTIONAL TIRE SUPPORT DEVICE

BACKGROUND OF THE INVENTION

Tires on passenger vehicles and small to large size trucks are designed to provide the vehicle owner with many miles of safe usage. These tires are provided with a patterned heavy outer external tread surface and the majority of them are manufactured with an inner steel belt over laid with plies of nylon or equivalent inner liners that cross over the full width of the tire and down its sides and fold into the bead that seals against the vehicle's inner wheel rim. The multiple layer plies are molded into the tire to secure the layers in place, to provide protection from puncture of nails and other road hazards that the tire comes in contact with during its long running life. Most tires manufactured today are considered as tubeless tires and are inflated with air and or nitrogen under pressure, and fill the tires internal cavity, forcing the tires inside and outside bead to seal against the metal facing rim of the vehicle wheel and hold it in that seal position.

With all of these protective layers, the tires often times still receive punctures that perforate them and as they are under pressure when filled with air, they go flat and cannot be driven on.

A loss of tire pressure causes deflation of the tire and in some cases can even cause serious accidents, injuries and or death to the riders.

The main difficulty with a tubeless tire is that when the tire tread is punctured the pressurized air within the tire escapes and the tire goes flat. This will cause the lack of pressure against the tire bead that normally holds these annular tire beads against the wheels rim flange.

Once the air escapes with the tire underload, the vehicle's weight breaks away the bead rim contact and a dangerous condition is initiated.

This invention provides a means to prevent this type of accident occurring.

There have been quite a few patents issued that address this run flat problem, as follows:

U.S. Pat. No. 5,634,993 DRIEUX for "rim and assembly of a tire and ring shaped tread support on same". This invention applies to modification of both the tire carcass and the tires rim and does not apply to the present submitted invention U.S. Pat. No. 5,660,653 GARDETTO for "run flat support for pneumatic tire wheel". This invention addresses the run flat condition by attachment to the wheel a rectangular channel open on one side and circular to fit on the outside of the wheel rim. This metal assemblage is screwed to the rim and the two open legs of the rectangular shape bears against the tires two beads and the rim to provide a close out box section intended for supporting weight when the tire pressure escapes from a punctured tire.

The annular box supports the deflated tire in the run flat condition and requires modifications to the vehicle rim on the installation.

This invention does not apply to the present submitted invention.

U.S. Pat. No. 5,868,190 WILLARD et al for "run flat tire with an improved bead to rim interface". This invention applies a belt package with a plurality of radially reinforced layers of belt plies to the interior surfaces of the tire tread and the tire sidewall to support the tire in a run flat condition.

This invention modified the tire to support such a tire in the deflated condition and does not apply to the present submitted invention.

U.S. Pat. No. 5,891,279 LACOUR, for "safety support made of a flexible elastometric material for tires". This invention applies to the mounting of a tire on a vehicle's wheel rim. The invention modifies the vehicle rim to provide a means for capturing an annular tire within a tire assemblage that can support the vehicle when the tire is punctured and runs flat.

This invention does not apply to the present submitted invention.

U.S. Pat. No. 6,116,308 YOSHIDA for "run flat tire system". This invention applies to a run flat tire system having an annular core body of an elastic closed cell material installed in the tire when assembled on the wheel of a motorcycle. The tire for a motorcycle is designed to accept running loads on its tread and on its sidewalls as it turns and tilts during operation. For that reason the tread is not flat like an automobile tire tread but curved and thick on the sidewalls to accept running loads full around the tire. This invention provides solid backup to both the curved section of the tire and to the sidewalls of the motorcycle tire and is intended as a solid core for the tire to run in the run flat condition.

This invention does not apply to the present submitted invention.

U.S. Pat. No. 6,321,808 B1 SPRAGG et al for "an expandable band for run flat tire and method of making a tire", addresses this condition by making major changes to the tire. This invention molds into the tire carcass a series of metal bands between plies of the reinforcing fabric bands, and has the former overlaping each other and extending down each side of the tire's carcass to protect the tire sidewalls, treads and applies pressure against the tires beads and their contact to the wheel rim.

This pre-shape of these metal insert bands prevent the tire from collapsing and go flat.

This invention does not apply to the present submitted invention.

U.S. Pat. No. 6,516,845 B2 NGYEN et al addresses "a support device within a tire cavity to provide run flat capability". This invention is based on having a special tire rim that contains a metal cavity that has mounted around this cavity three annular tubes welded to it and to each other to provide a means for supporting the vehicle's weight and providing a means for the tire's tread when it has collapsed from a puncture to deflate against these tubes and prevent the tire from going completely flat.

This invention does not apply to the present submitted invention.

U.S. Pat. No. 6,668,884 B2 KOCH et al provides "a sensor mounted on the inside of the tire carcass", that monitors the movement of the tire's bead away from the vehicle's wheel rim to inform the driver that separation from each other has occurred and the tire is about to go flat.

This solution does not apply to the present invention.

U.S. Pat. No. 6,814,114 B2 BOUVIER et al for "tire to rim rotation limiter for a run flat assembly." This invention applies a means to provide for operating a vehicle during periods of both low tire pressure and normal tire pressure. The invention provides a means to prevent the tire to rim rotation by engaging beads and slots and indentations in the wheel rim to inhibit and stop tire rotation relevant to the rim.

This invention does not apply to the present submitted invention.

The present invention improves upon previous run flat tire configurations in that it can be applied to standard tires and rims and the previous known run flat configurations require modifications to basic tires and rims and suffer from a number of disadvantages:

(a) DRIEUX requires major changes to tire beads and tread to prevent loss of tire pressure that causes tire deflation and can lead to serious accidents.
(b) GARDETTO and NGYEN et al both require that the vehicle's wheel rim must be modified to provide structure to support the vehicle when the tire collapses.
(c) WILLARD et al require that the tire must be modified to provide a plurality of radially reinforced layers of belt plies to the interior of the tire's sidewalls and tire's treads.
(d) LACOUR requires a tire installed within a tire to accept a run flat condition.
(e) YOSHIDA requires that the tire must contain an additional solid backup core to accept the run flat condition.
(f) SPRAGG et al require that the tire must be redesigned and changed to mold in additional metal bands to prevent collapse of the tire.
(g) KOCH et al provide sensors that require the tire to be modified and sensors must be added to the tire manufacture to inform the vehicle driver the problem is about to occur.
(h) BOUVIER et al require that the tire and rim must be modified to contain special interface connections and variations to engage with each other and operate in a run flat condition.

Accordingly, besides the objectives and disadvantages discussed above in the various patents, the following objects and advantages of the present invention are:

A) to provide a run flat tire device that requires no changes to the vehicle's wheel rims;
B) to provide a run flat tire device that requires no changes to the standard tire;
C) to provide a run flat tire device that does not require sensors installed in the tire, but may use sensors for added safety;
D) to provide a run flat tire assembly that does not require attachment on the wheel rim a structure to support a vehicle in this condition;
E) to provide a run flat tire support device that permits the tire to operate in a run flat condition without completely collapsing;
F) to provide a run flat tire with a multifunctional support device that contains and maintains air pressure within a redundant inner tube even while the tire tread is punctured.

This invention provides a means for inserting into the tire, when it is first installed on the wheel of the vehicle, a circular multifunctional tire support device that permits the tire even when punctured, to continue to support the vehicle. It permits the tire to remain functional and not go entirely flat.

This invention provides a means for inserting into the tire, when it is first installed on the wheel and can be mounted on the wheel using common shop tire equipment.

This multifunctional tire support device provides a means that once the tire is punctured and looses air pressure, it still maintains the support of the vehicle and continues to keep the tire affixed on to the wheel, above the rim of the wheel, and will minimize any risk of possible damage to the wheel rim when driven in this condition. In addition, since the circular multifunctional inner support bears against the tire's inner sidewalls and minimizes them against extreme sidewise flexing, when the vehicle turns corners and changes lanes at high speed freeway, the inner barrier pressing against the sidewalls of the tire reinforces these sidewalls from those side loads that the tire receives when subject to such cornering conditions.

Thus, this invention enhances total tire, wheel, and vehicle handling performance. This minimizing of the tire flexing also aides in keeping more tread surface on to the road and inhibits side slipping and skidding on wet and icy roads operating during weather hazard conditions. Furthermore, it provides a means for elevating the tire that is partially deflated, but still on the wheel, and will maintain the vehicle's stability in a safe controlled manner. Thus, the vehicle can still continue to operate even after the tire has received one or many punctures.

SUMMARY OF THE INVENTION

This invention provides a means for inserting into the tire when it is first installed, on the wheel of the vehicle a circular multifunctional tire support device that permits the tire even when punctured, to continue to support the vehicle. It permits the tire to remain functional and not go entirely flat.

The multifunctional tire support device mates with the inside curvature of the tire and contacts the tire annularly full around the inside envelope of the tire. On each side of the functional tire support the unit slopes outwardly on a diagonal shoulder projection that bears on the tire's inward sidewalls. This provides a means for accepting side loads induced into the tire's sidewalls by adverse flexing and cornering of the vehicle on high speed turning.

At the tire's internal point of contact the support correctly positions itself at the widest point of the tire's inside envelope and prevents movement of the support in the tire as the wheel of the vehicle rotates.

By contacting the sidewalls at this widest point, the support ensures that the tire can accept any impact loads against the sidewalls such as impact loads that would be received when the tire and wheel are inadvertently driven against a street curb or like impingement on the open road. This annular shoulder projection provides an inner reinforcement for the tire at point of contact. From this point of contact, the tire reinforcement tapers inward to a point that intersects with a diametrical cylinder that holds a flap that entraps an inner tube between the vehicle's rim and the multifunctional tire support device.

The flap provides a barrier protection between the tire's sidewall plies and the incased innertube which could rub against the sidewalls and promote deflation of the inner tube. The multifunctional tire support device shape and location in the tire provides a space between the lower surface of the device and the rim for installation of the inner tube. This inner tube when inflated applies an upward force against the base of the multifunctional tire support device and forces the device against the inner surface of the tire's tread carcass keeping and holding it in the position that prevents complete collapse of the tire. In this upward extended position, the tire can support the vehicle weight and run in a normal operating position or run in a run flat condition. In addition, the inner tube is positioned in the tire so that it can apply a force against the inner membrane flap provided and apply additional force against the tire's bead on either side of the tire. This prevents the bead from separating and pulling away from the upward standing rim flange that provides tire to rim sealing when air pressure is provided the tire on installation.

The location of the multifunctional support device relative to the tire and wheel rim provides a circular cavity for the inner tube.

Should the inner tube be punctured by some extreme object, the multifunctional support device will slide a short distance toward the rim and still provide backup support to the tire's tread and hold it in a position to provide run flat capabililty to the tire.

The pointed shoulder projections on both sides of the support device that bear against the tire's sidewalls prevents the device from sliding downward toward the rim and for it to move in that direction the tire's sidewalls must be forced to distort outward and downward to provide space for the support to move away from the tread of the tire.

This movement downward is retarded by the tire casing and the inner tube.

If the inner tube is not punctured, the device cannot move toward the rim.

If the inner tube is punctured or lacks air, then the support is forced to compress the inner tube and allows it to move downward and rest on the deflated inner tube and rim support surface.

The multifunctional tire support device has also a number of lightning hole cavities that pass through it and are molded into the device. These holes are covered over on both the upper outside envelope of the device and over the internal inside of the inner tube cavity with a multi ply membrane covering to provide an additional barrier against puncture. The membrane covering also provides a smooth surface to minimize rubber friction and wear that the tire inner tube would encounter in a run flat condition.

In addition the multifunctional tire support flap provides an annular barrier between the tire's inner sidewall plies and the inner tube captured by the run flat support device. The multifunctional tire support device is molded from equivalent tire rubber in order that the tire and its internal run flat device could expand and contract when heating and cooling is encountered in both running conditions and weather environmental conditions.

This invention provides several embodiments, one that shows how the support can provide a run flat operating condition without an inner tube, and one with an inner tube, using the same support device.

As the multifunctional tire support device rests against the internal tread envelope of the tire and is quite thick in cross section and also bears on the tire's sidewalls any chance for a nail or equivalent, to puncture the tire and pass through the tire support device and still reach and penetrate the internal inner tube and puncture it is improbable. This condition would have to penetrate the tire's tread and release the air pressure within the tire but would not release the redundant tire pressure within the inner tube. In this condition the tire could still run and operate without fear of the tire blow out that causes so many deadly accidents.

This invention also provides an optional embodiment that utilizes an almost identical multifunctional tire support device that contains an enlarged cavity on its lower surface for installation of the inner tube previously discussed. This embodiment functions in like manner to the previous multifunctional support device and provides run flat capability to the tire and in this condition is supported by the tire rim should a puncture occur.

This device with the enlarged inner tube cavity reduces the weight of the multifunctional support device and still can support the tire when punctured and can, as the first embodiment did, provide tire support whether the tire has air or not, and can run with a soft partially air filled tire or completely deflated, and still run in the run flat condition.

This invention provides the capability to operate with or without an inner tube, it provides how it can still operate with a punctured tire and prevents the tire from completely collapsing. This invention provides the tire and its vehicle operator the capability to run in the so called run flat condition although the tire actually cannot fully collapse even in this subject condition.

DETAILED DESCRIPTION OF THE INVENTION

Reference will now be made to embodiments of the invention, one or more examples of which are illustrated in the drawings. Each example is provided by way of explanation of the invention and not meant as a limitation of the invention. For example, features illustrated or described as part of one embodiment can be used with another embodiment to yield a third embodiment. It is intended that the present invention includes these and other modifications and variations.

The typical embodiment of the run flat multifunctional tire support device of the present invention is illustrated in FIG. 1 cross section view. This shows a conventional pneumatic tire (10) air or nitrogen filled (29) mounted on a standard automobile or trucks wheel rim (12). Installed in this said tire and standard rim there is a multifunctional tire support device (14) that is annular and doughnut shape and its outer shape matches the inner contact surface of the said tire full around but not attached to it. This outer surface (16) of said multifunctional tire support device embodiment contains a protective barrier membrane cover (17) molded to the said outer surface of the molded support (18). This said membrane overlaps a series of lightning holes (20) in the said device and reinforces the device, and it is the interface surface that contacts the inner side of the said tire and provides additional reinforcement to the said tire.

The said multifunctional tire device contains a full around projecting shoulder (22) formed from the intersection of two diagonal surfaces (21) and (23) on the said device providing a point of contact (24) that contacts the sidewall (13) of the said tire. This said contact reinforces the said tire sidewalls during a runflat condition and stabilizes the said sidewall as the tire collapses upon puncture and inhibits damage to the sidewalls when the vehicle is operating in the run flat mode of operation. The said lower diagonal surface (23) abuts to an annular surface (25) that projects downward toward the center of the said tire and forms a projecting abutment ring (19) that encircles the run flat device.

The said multifunctional device is lined with a membrane liner (17) that extends downward and provides a flap (26) that also extends downward beyond the lower surface (31) of the said device and contacts the inside surface of the tire bead (15). An additional membrane surface (34) bonded to the base of the said device overlaps the multiplicity of the said lightning holes in the said device and reinforces the said device and prevents it from losing shape when a run flat condition occurs and load is applied to the tire tread (11) and transferred down to the said device and in turn drives it down on to the said rim support surface (33).

When the run flat condition occurs the device is driven down behind the said tire bead and applies load and forces the said bead tight against the said wheel rim projecting flange (32) This prevents the tire carcass in the run flat condition from pulling away from the contact with the said wheel rim projecting flange and ensures that the tire carcass as it begins to crush in the run flat condition will remain in an upright functional attitude and can operate in this run flat condition with the vehicle load on the tire, then on the device, and then on to the rim support surface safe condition. In this operating condition the said device moves downward and transfers the full weight vertically on to the said rim support surface of the said tire rim. When this condition occurs the invention of providing a multifunctional device permits the tire to operate in a normal operating attitude and condition and also provides the capability for it to continue to run in this condition without collapsing and causing excess damage to the tire.

FIG. 2 provides a cross section view of an optional embodiment of the said multifunctional device showing it installed in the said tire. In this configuration an inner tube (30) is installed in the cavity (27) between the said device and the said wheel rim. The said inner tube when inflated with air or nitrogen (29) forces the said device uptight against the internal side of the said tread of the said tire. When a puncture occurs to the said tread or to said sidewalls the air or nitrogen around the tire escapes and the said tire enters its run flat condition. When this occurs, the said tread moves downward and bears hard on the said device and in turn picks up the transfer load and attempts to drive the said device toward the said rim. Inasmuch as the said device is backed up with the said inner tube, pressurized with air or nitrogen, the said tire cannot collapse and can still operate and function in its same operating condition.

The driver of the vehicle, in this condition, would probably not know that his tire has been punctured. The vehicle can still safely operate and run when the said device has assumed a run flat backup function. The said device has now supported the punctured said tire tread that applied backup reinforcement to the said tire sidewalls and is applying load through the said inner tube to the said tire sidewalls and against the said wheel rim projecting flange. In addition, the said inner tube positioned a sizeable distance from the said tread is not vulnerable to the same puncture and so the said inner tube continues to function filled with air or nitrogen, as it was intended.

FIG. 3 provides an optional embodiment of the said multifunctional support tire device invention. In this embodiment the said multifunctional device contains an internal cavity (27) that has been added to lighten up the said device. It functions and operates in like manner to the prior embodiment. The said multifunctional device contains on its internal annular diameter a convex cavity (27) for additional lightning purposes and to provide additional strength to the said abutment ring (19) which can possibly contact the said tire rim in a collapsed tire condition. In this tire condition the said multifunctional device bridges over the said rim and transfers the crush compression loads of the said collapsing tire to the outer and inner upstanding rim flanges (32). The said multifunctional device convex cavity is lined with a membrane liner (28) that covers over the said lightning holes that penetrate the said convex cavity and prevents them from being stretched out of shape under load and provides integrity and continuity to the curved shape of the said abutment cavity ring.

FIG. 4 shows the embodiment of the said multifunctional device with the insertion of the said inner tube in the said tire cavity. In this illustration the addition of the said inner tube, when inflated with air or nitrogen exerts a force upward on the said multifunctional device so that it can support the said tire tread even when it is punctured. In addition, the said inner tube applies pressure on the said tire sidewall and captures the said tire beads (15) so that they cannot disengage with the said wheel rim upstanding flange and therefore prevents the possibility of the tire carcass from being damaged in the run flat working condition.

FIG. 5 shows the said multifunctional tire device in a tire that has received a puncture and the said device has moved downward toward the run flat condition. In case this condition occurs, the design and shape of the molded support (18) prevents the said tire from completing collapse and going flat. It can be seen in this illustration that said projecting shoulder (22) on both sides of the said device extend outward to provide contact reinforcement to the said sidewalls and they extend beyond the internal width of the said rim flanges. This extension and shape pushing against the internal side of the said sidewalls will not let the said tires sidewall move inward and enter the said rim, and thus forces the said device to retain the said tire in a running upright location, attitude and position. The said punctured tire supported by the said device can accept the vehicle weight and crush condition without producing the tendency for the said sidewall to peel off and away from the said rim flange. In addition, the said abutment ring now entraps the said tire bead between the said abutment ring and the said rim flange to provide a means for the said device to retain the punctured tire in an attitude and position to run in a run flat condition.

The said multifunctional tire device provides several other additional features for aiding and running in a run flat condition. In case a condition occurs that the said inner tube is punctured in the said tire, the design of the device prevents the said tire from completely collapsing and going flat. In FIG. 2 and FIG. 4 illustrations it can be seen that the said projecting shoulder (22) on the said device (35) that extends outward to provide contact reinforcement to the said tire sidewalls extends beyond the internal width of the said rim flange (32). This extension and shape pushing against the internal side of the sidewalls will not let the said tire's sidewalls move inward and enter the said rim and thus forces the said device to retain the tire in the running location, attitude and position. The punctured tire supported by the said device can accept the vehicle weight and crush condition without producing the tendency for the said sidewall and said tire bead to peel off the said rim flange. In addition, with the air depleted from the said inner tube and the said device being pushed toward the vehicle rim, the said annular surface (25) and the said projecting flap (26) is driven down and behind the said tire bead (15) and forcefully prevents the said bead from being pulled away from the said rim flange. In conjunction with this run flat condition, the said annular surface (25) can only move a short distance before it contacts the said wheel rim support surface (33). Actually, the said annular surface (25) cannot travel down into the said rim rest position as the said sidewall thickness, being displaced down and outward by the said projecting device contact point, prevents the said tire bead from escaping from the said rim. In addition, in this run flat condition, should some other puncture condition occur, the said multifunctional device lower annular surface (25) will come to rest on the said wheel rim support surface and at this engagement point will safely support the said run flat tire and prevent it from ever collapsing flat in the run flat condition.

FIG. 5 also provides a sectional view showing how the said multifunctional device supports the said tire when it has traveled down on to the said rim and rests on the said rim support surface, and how it handles the collapse of the tire's carcass and its movement on to the said rim, should this condition occur.

REFERENCE NUMERALS TO DRAWINGS

Figure 1:
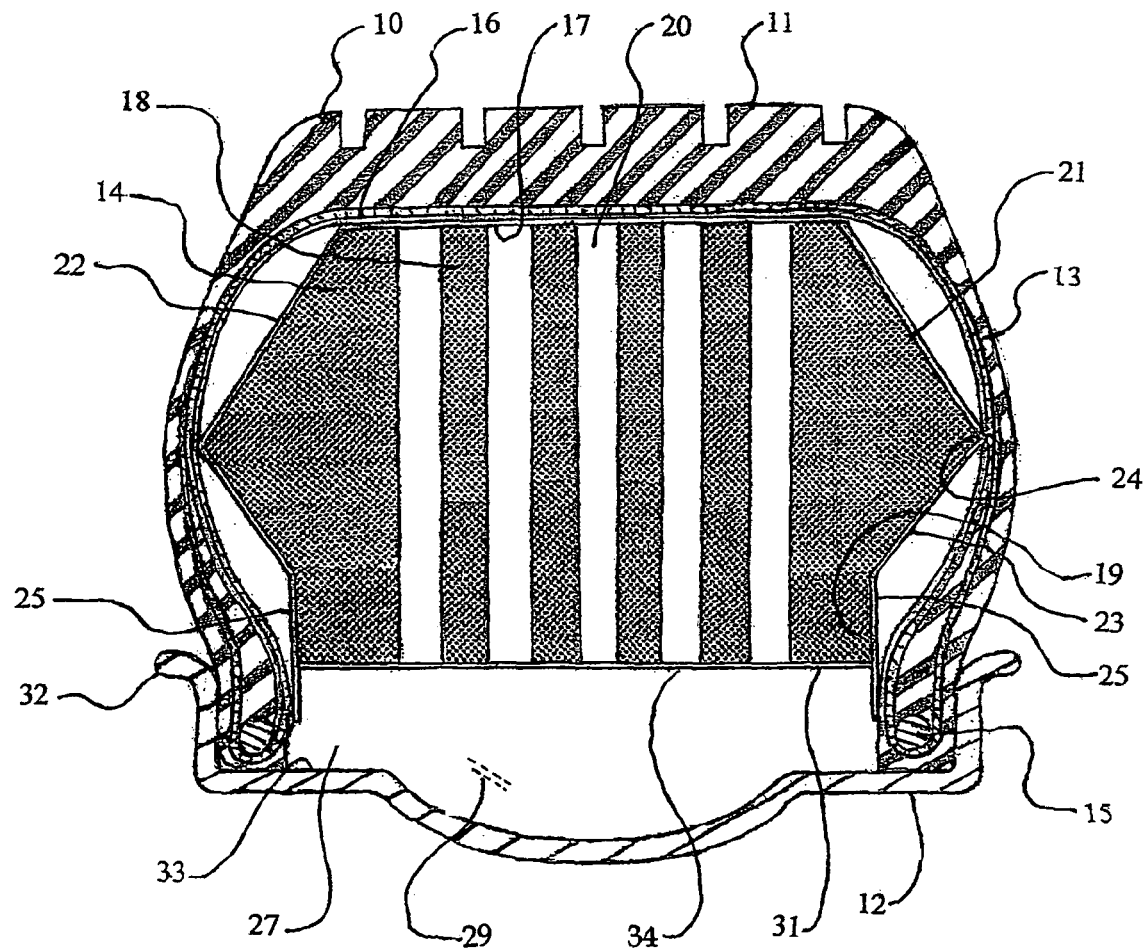
FIG. 1—Shows a cross section of the invention installed in a tire mounted on the wheel of a vehicle. This view shows how the tire support device provides inner reinforcement to the tire sidewalls and provides a safety barrier membrane between the tire tread and the support device to inhibit the tire puncture.
Figure 2:
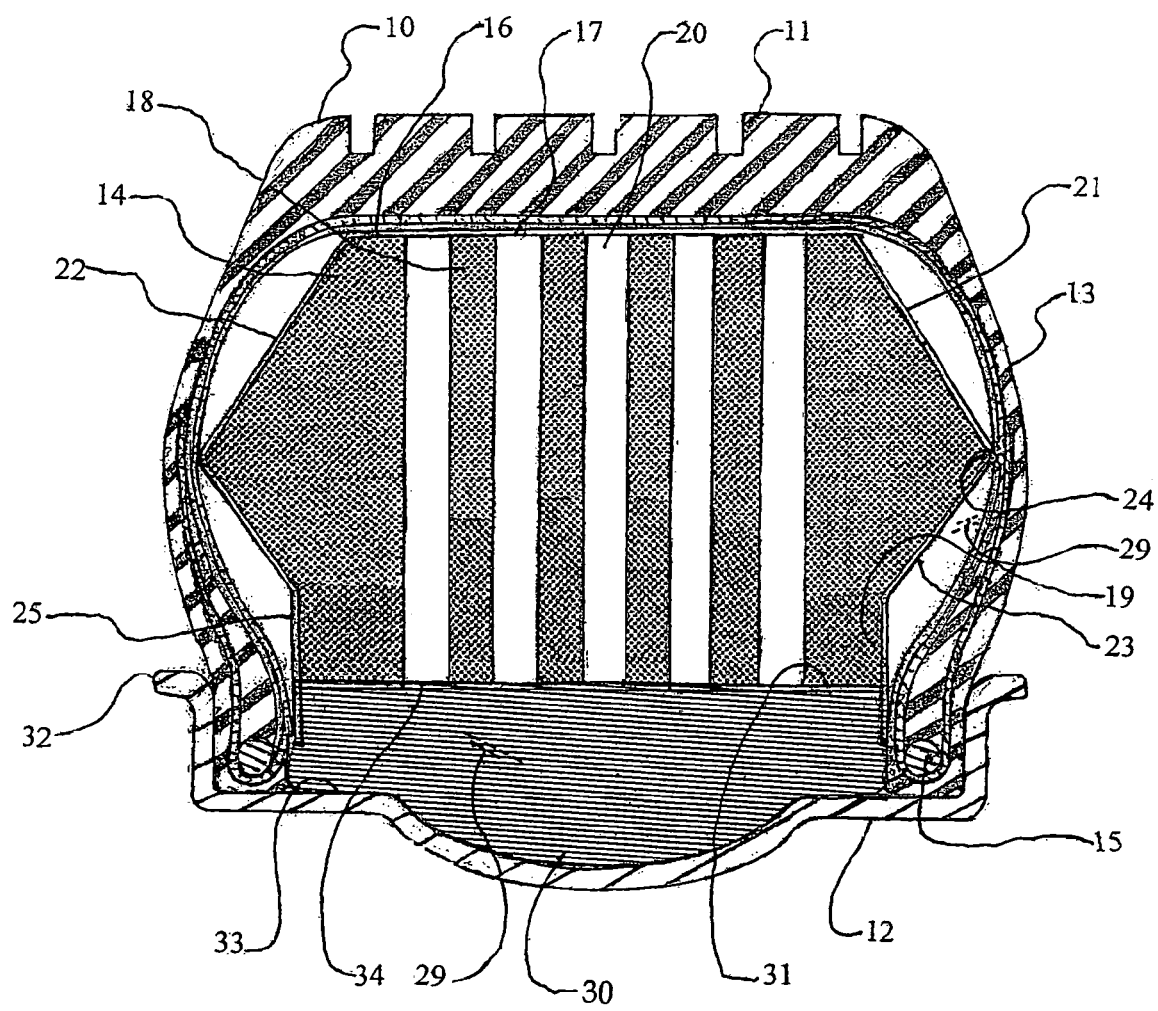
FIG. 2—Shows a cross section of the invention in a tire that contains an inner tube and how the support device works in a run flat condition and supports the punctured tire.
Figure 3:
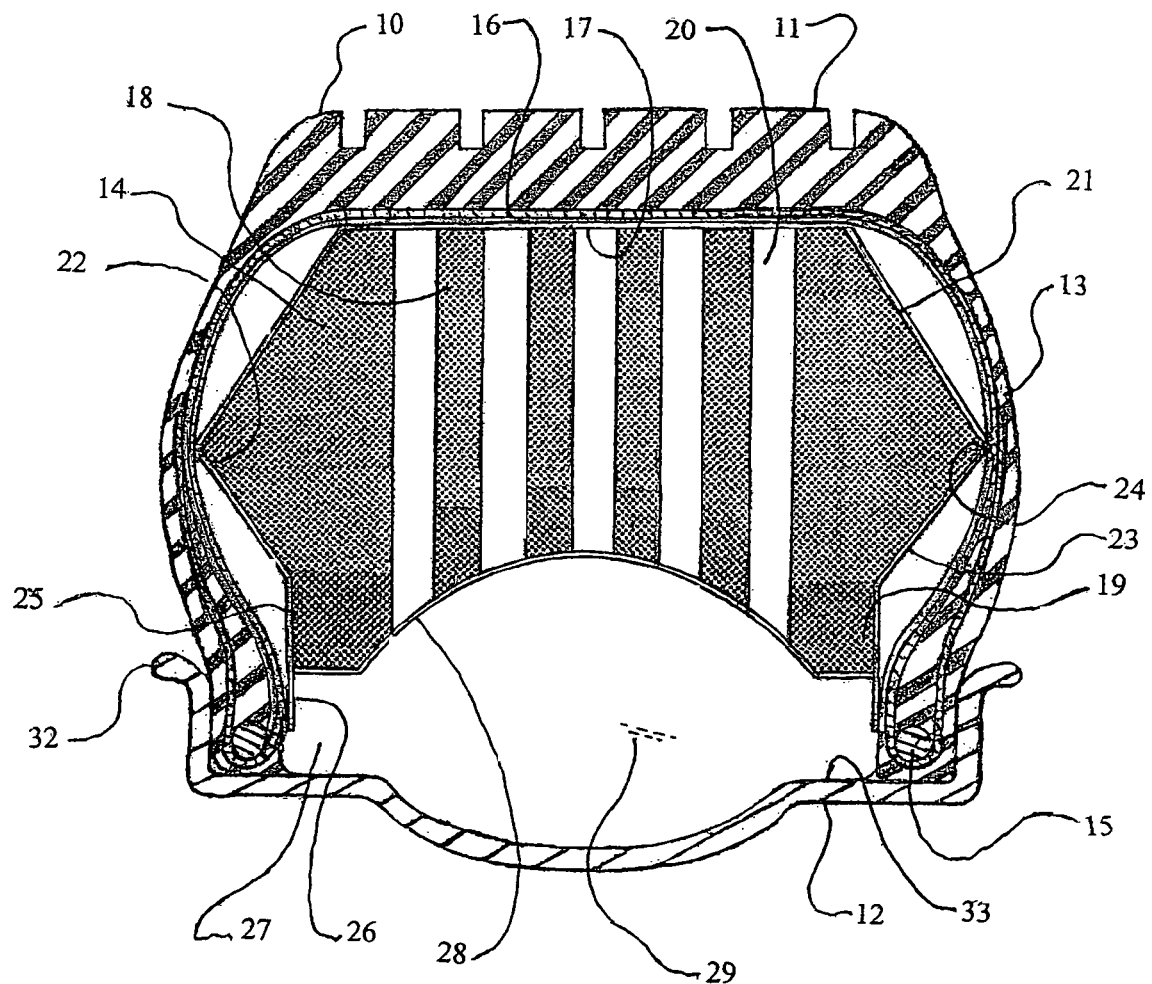
FIG. 3—Shows an alternate embodiment of the multifunctional tire support device containing an inner cavity that reduces weight and provides additional space for installing an inner tube in the assembly.
Figure 4:
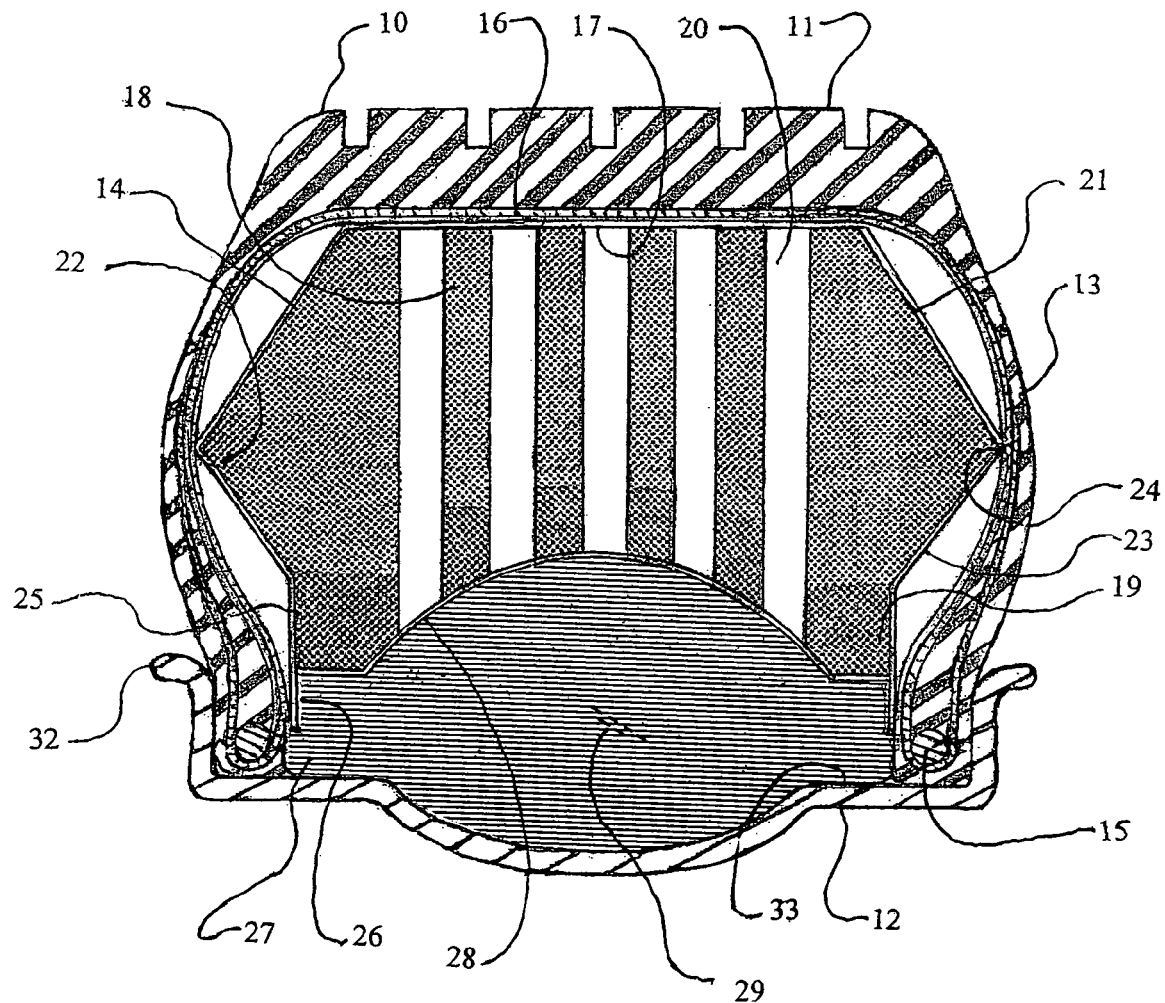
FIG. 4—Shows the alternate embodiment with an inner tube installed.
Figure 5:
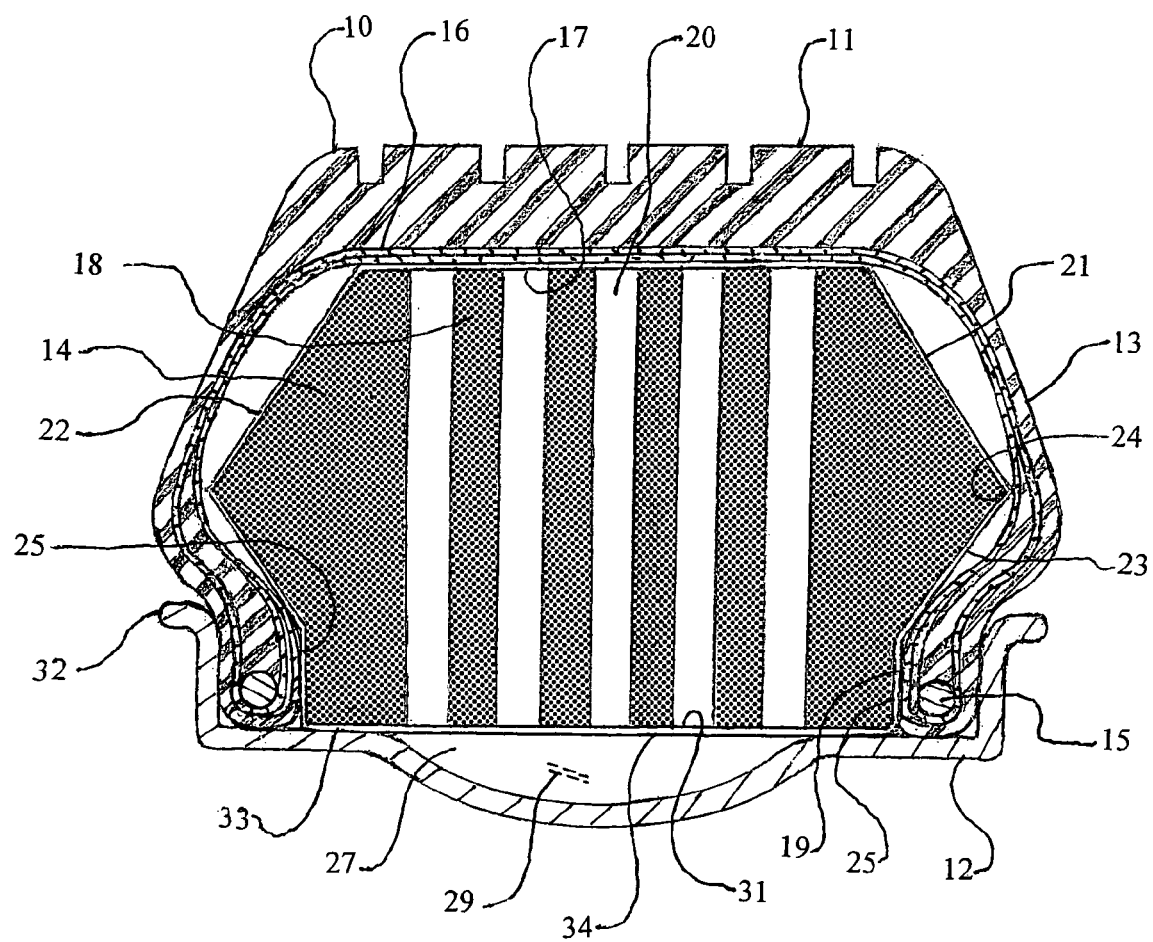
FIG. 5—Illustrates the run flat condition with a punctured tire tread and the multifunctional support device resting on the tire rim support surface.

10 Tire
11 Tire tread
12 Rim
13 Tire sidewalls
14 Multifunctional tire support device
15 Tire bead
16 Outer surface
17 Membrane cover outer
18 Molded support device
19 Abutment ring
20 Lightning holes
21 Upper diagonal surface
22 Projecting shoulder
23 Lower diagonal surface
24 Point of Contact
25 Annular surface
26 Projecting flap
27 Cavity
28 Membrane covering inner
29 Air/Nitrogen
30 Innertube
31 Lower surface
32 Rim projecting flange
33 Rim support surface
34 Lower surface membrane
35 Device with cavity

I claim:

1. A wheel assembly including a rim, an inner tube and a multi functional semi elastic molded shape tire support device, wherein said inner tube is positioned between said rim and said support device; said support device contains a plurality of lightning holes that radiate outward through said tire and is completely covered by a first membrane that contacts a tire inner peripheral surface in a crown region, and a second membrane that contacts an outer peripheral surface of said inner tube such that a radially inner end of the said first membrane extends radially inward of said second membrane and defines flaps that contact respective bead regions, wherein a) said tire support device has protrusions extending outward on each side to reinforce inner side walls of the tire, and b) said tire device as an independent unit can be inserted into or removed from any conventional tire.

2. A wheel assembly devoid of an inner tube and including a rim, a tire and a multifunctional semi elastic molded shape tire support device; said support device contains holes of various sizes that radiate outward through said tire and is completely covered by a first membrane that contacts a tire inner peripheral surface in a crown region, and a second membrane that is parallel to the tire rotational axes and is positioned slightly above respective bead regions such that a radially inner end of said first membrane extends radially inward of said membrane and defines flaps that contact respective bead regions; wherein a) said tire support device has protrusions extending outward on each side to reinforce inner sidewalls of the tire, and b) a space is present between said device and said rim that permits said device to move inward and rest on said rim to support a tire tread and hold first and second tire beads against said rim in a run flat condition.

* * * * *